US012632690B2

(12) United States Patent
Kajikiya et al.

(10) Patent No.: US 12,632,690 B2
(45) Date of Patent: May 19, 2026

(54) ANTENNA DEVICE AND IC CARD HAVING THE SAME

(71) Applicant: TDK Corporation, Tokyo (JP)

(72) Inventors: Shoma Kajikiya, Tokyo (JP); Toshio Tomonari, Tokyo (JP); Chris T. Burket, Lincolnshire, IL (US)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 18/891,079

(22) Filed: Sep. 20, 2024

(65) Prior Publication Data

US 2025/0094761 A1      Mar. 20, 2025

Related U.S. Application Data

(60) Provisional application No. 63/583,986, filed on Sep. 20, 2023.

(51) Int. Cl.
G06K 19/077      (2006.01)

(52) U.S. Cl.
CPC . G06K 19/07773 (2013.01); G06K 19/07747 (2013.01)

(58) Field of Classification Search
CPC .................. G06K 19/07773; G06K 19/07794
USPC ............................................ 235/492; 23/492
See application file for complete search history.

(56) References Cited

U.S. PATENT DOCUMENTS

| | | | | |
|---|---|---|---|---|
| 8,870,080 | B2 * | 10/2014 | Finn | ................. G06K 19/07773 |
| | | | | 235/492 |
| 2015/0207223 | A1 | 7/2015 | Nakano | |
| 2018/0123221 | A1 * | 5/2018 | Finn | ................. G06K 19/07786 |
| 2020/0034578 | A1 | 1/2020 | Finn et al. | |
| 2021/0049439 | A1 * | 2/2021 | Finn | ................. G06K 19/07354 |
| 2021/0350198 | A1 | 11/2021 | Finn | |

FOREIGN PATENT DOCUMENTS

| | | |
|---|---|---|
| JP | 2013-162195 A | 8/2013 |
| WO | 2015/022859 A1 | 2/2015 |

* cited by examiner

*Primary Examiner* — Toan C Ly
(74) *Attorney, Agent, or Firm* — Rimon P.C.

(57) ABSTRACT

Disclosed herein is an antenna device that includes: a metal plate having a first slit extending in a long side direction thereof and a second slit extending in a short side direction thereof; a first coil disposed so as to overlap with the metal plate in a plan view and circling along an outer edge of the metal plate; and a second coil electrically connected to the first coil, disposed so as to be surrounded by the first coil, and disposed so as to overlap with the first slit. The first slit has a first end that is open to divide the outer edge and a second end terminating without reaching the outer edge. The second slit has a third end that is open to divide the outer edge and a fourth end terminating without reaching the outer edge.

20 Claims, 12 Drawing Sheets

ANTENNA DEVICE AND IC CARD HAVING THE SAME

CROSS-REFERENCE TO RELATED APPLICATION

This application claims the benefit of U.S. Provisional Patent Application No. 63/583,986 filed on Sep. 20, 2023, the entire disclosures of which are incorporated by reference herein.

BACKGROUND

The present disclosure relates to an antenna device and an IC card having the same.

U.S. Patent Publication No. 2021/0350198 discloses an IC card whose both surfaces are constituted by a metal plate.

SUMMARY

An antenna device according to one embodiment of the present disclosure includes: a metal plate having a first slit extending in a long side direction thereof and a second slit extending in a short side direction thereof; a first coil disposed so as to overlap with the metal plate in a plan view and circling along an outer edge of the metal plate; and a second coil electrically connected to the first coil, disposed so as to be surrounded by the first coil, and disposed so as to overlap with the first slit. The first slit has a first end that is open to divide the outer edge of the metal plate and a second end terminating without reaching the outer edge of the metal plate. The second slit has a third end that is open to divide the outer edge of the metal plate and a fourth end terminating without reaching the outer edge of the metal plate.

An IC card according to one embodiment of the present disclosure includes an antenna device, a second metal plate having an opening, and an IC module disposed in the opening of the second metal plate. The antenna device includes: a first metal plate having a first slit extending in a long side direction thereof and a second slit extending in a short side direction thereof; a first coil disposed so as to overlap with the first metal plate in a plan view and circling along an outer edge of the first metal plate; and a second coil electrically connected to the first coil, disposed so as to be surrounded by the first coil, and disposed so as to overlap with the first slit. The first slit has a first end that is open to divide the outer edge of the first metal plate and a second end terminating without reaching the outer edge of the first metal plate. The second slit has a third end that is open to divide the outer edge of the first metal plate and a fourth end terminating without reaching the outer edge of the first metal plate. The first and second coils are sandwiched between the first and second metal plates such that the IC module overlaps with the second coil.

BRIEF DESCRIPTION OF THE DRAWINGS

The above features and advantages of the present disclosure will be more apparent from the following description of certain embodiments taken in conjunction with the accompanying drawings, in which.

DETAILED DESCRIPTION OF THE EMBODIMENTS

Some embodiments of the present disclosure will be explained below in detail with reference the accompanying drawings.

Figure 1:
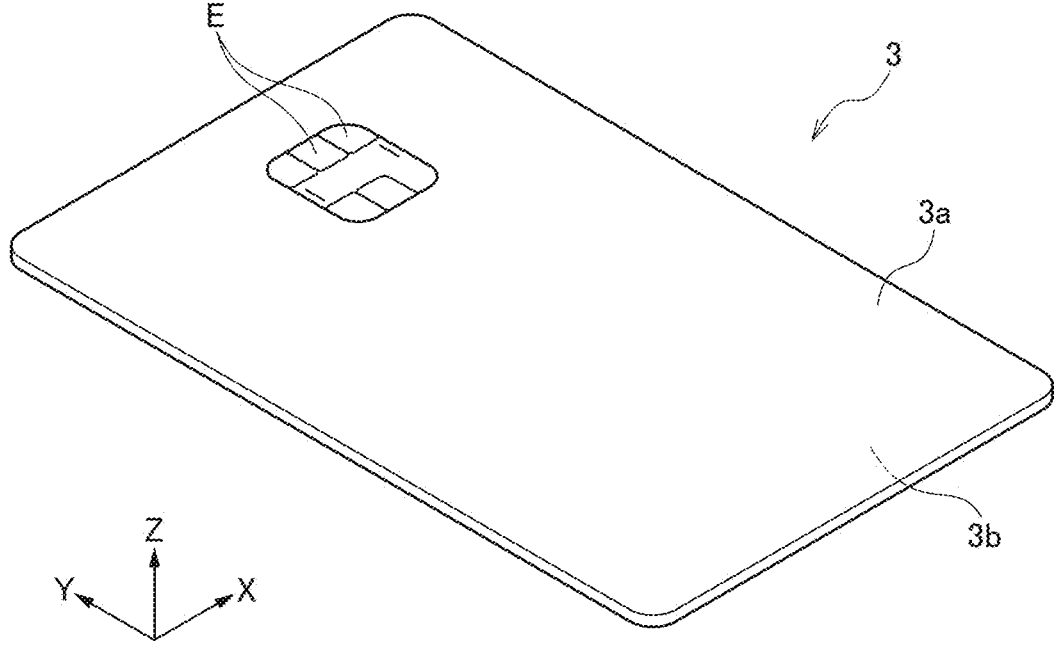
FIG. 1 is a schematic perspective view illustrating the outer appearance of an IC card 3 according to one embodiment of the present disclosure having an antenna device.

FIG. 1 is a schematic perspective view illustrating the outer appearance of an IC card 3 according to one embodiment of the present disclosure having an antenna device.

As illustrated in FIG. 1, the IC card 3 according to the present embodiment has a plate-like shape in which the Y-, X-, and Z-directions are defined as the longer length direction, shorter length direction, and thickness direction, respectively, and has an upper surface 3a and a back surface 3b which constitute the XY plane. The IC card 3 incorporates therein an IC module to be described later whose terminal electrode E is exposed to the upper surface 3a of the IC card 3.

Figure 2:
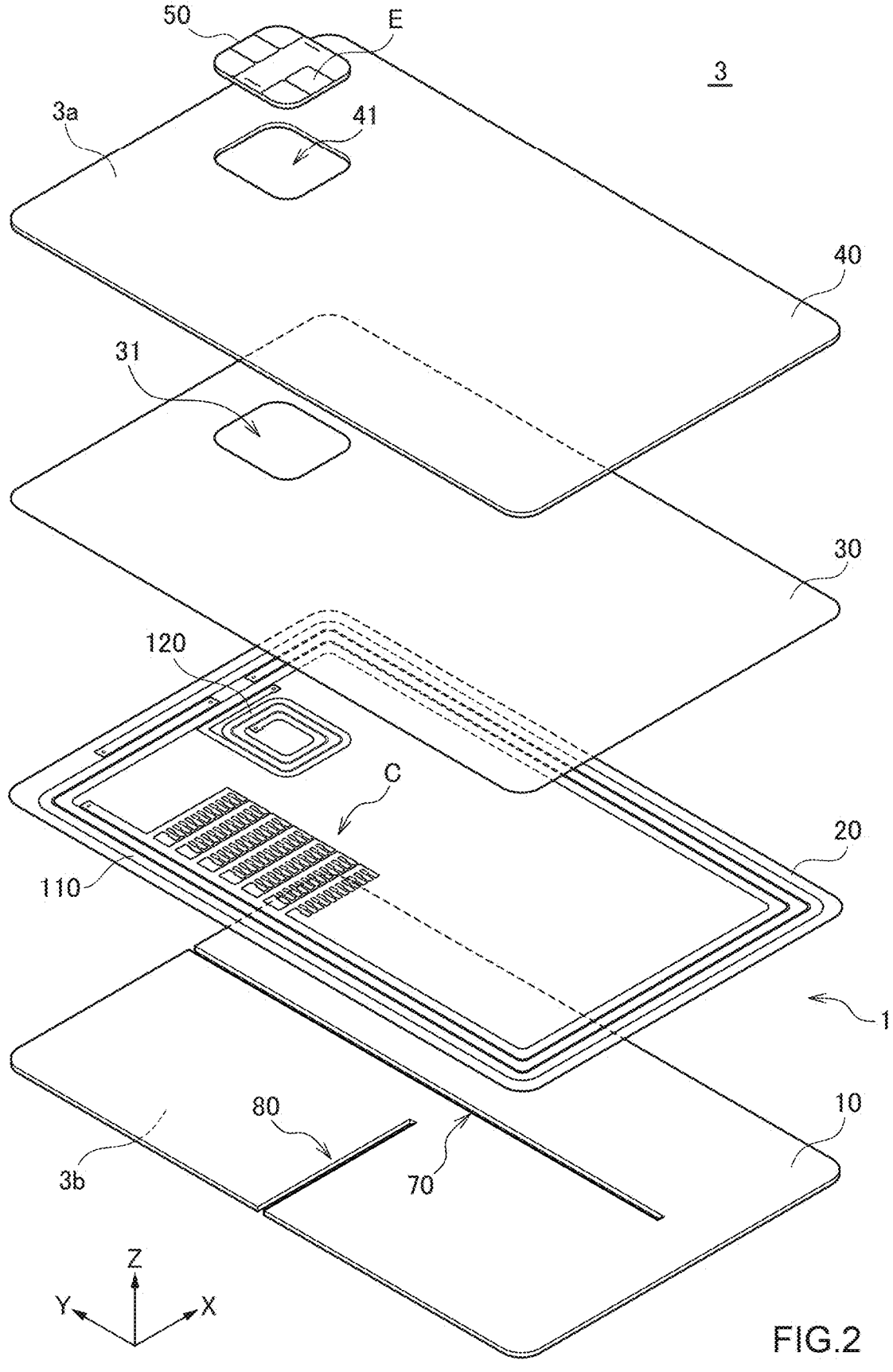
FIG. 2 is schematic exploded perspective view for explaining the structure of the IC card 3.
Figure 3:
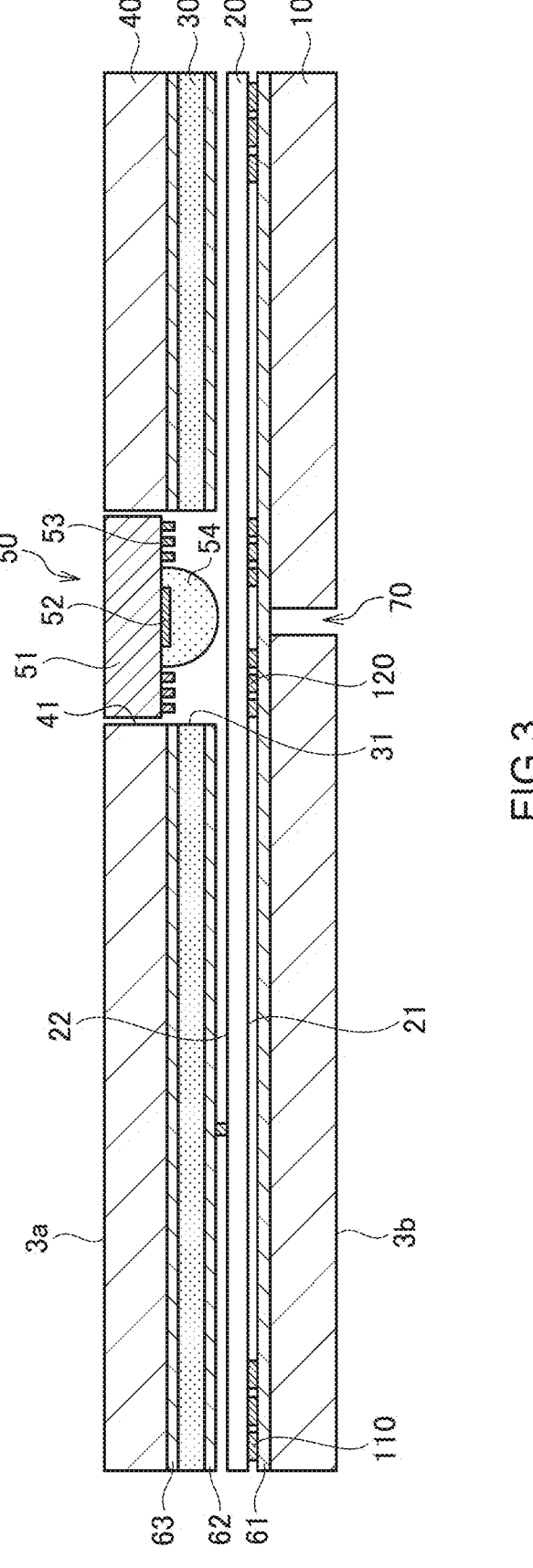
FIG. 3 is a schematic cross-sectional view for explaining the structure of the IC card 3.

FIGS. 2 and 3 are respectively a schematic exploded perspective view and a schematic cross-sectional view for explaining the structure of the IC card 3 having an antenna device 1 according to a first embodiment of the present disclosure.

The IC card 3 illustrated in FIGS. 2 and 3 has a structure in which a bottom metal plate 10, a substrate 20, a magnetic body 30, and a top metal plate 40 are laminated in this order from the back surface 3b side to the upper surface 3a side. The bottom metal plate 10 constitutes a first metal plate, and the surface thereof constitutes the back surface 3b of the IC card 3. The top metal plate 40 constitutes a second metal plate, and the surface thereof constitutes the upper surface 3a of the IC card 3. The top metal plate 40 and bottom metal plate 10 are each made of a metal material such as stainless steel or titanium. The top metal plate 40 has a through hole 41 in which an IC module 50 is disposed. Thus, the IC card 3 is a card whose upper and back surfaces are constituted by the metal plates.

The substrate 20 is a film made of an insulating resin material and has conductor patterns on first and second main surfaces 21 and 22 which are positioned on mutually opposite sides. The conductor patterns provided on the substrate 20 include a first coil 110 and a second coil 120. The antenna device 1 according to the present embodiment is constituted by at least the bottom metal plate 10, first coil 110, and second coil 120. The bottom metal mainly functions as an antenna that communicates with external devices by using electromagnetic coupling, the first coil 110 mainly functions as a resonance circuit electromagnetically coupled to the bottom metal plate 10, and the second coil 120 mainly functions as a coupling coil electromagnetically coupled to the IC module 50. In the present embodiment, the first and second coils 110 and 120 are sandwiched between the bottom metal plate 10 and the top metal plate 40.

A conductive material provided on the first and second main surfaces 21 and 22 of the substrate 20 constituting the conductor patterns may be copper, aluminum, or an alloy thereof, for example. The conductor patterns may be provided on the first and second main surfaces 21, 22 of the substrate 20 with another material layer, such as conductive a resin, interposed therebetween. The insulating resin material constituting the film-like substrate 20 may be PET (Polyethylene Terephthalate), PI (Polyimide), or the like. The first main surface 21 of the substrate 20 faces the bottom metal plate 10, and the second main surface 22 of the substrate 20 faces the top metal plate 40 through the magnetic body 30. The bottom metal plate 10 and substrate 20 are stuck to each other through an adhesive layer 61.

The second main surface 22 of the substrate 20 is covered with the magnetic body 30. The magnetic body 30 may be a sheet-like member or a coated body coated onto the second main surface 22 of the substrate 20. When the magnetic body 30 is a sheet-like member, the magnetic body 30 and substrate 20 are stuck to each other through an adhesive layer 62 as illustrated in FIG. 3. When the magnetic body 30 is a coated body coated onto the second main surface 22 of the substrate 20, the magnetic body 30 and substrate 20 are directly stuck to each other without an adhesive layer. The magnetic body 30 is stuck to the top metal plate 40 through an adhesive layer 63. The magnetic body 30 has a through hole 31 at a position overlapping the through hole 41 formed in the top metal plate 40.

Figure 4:
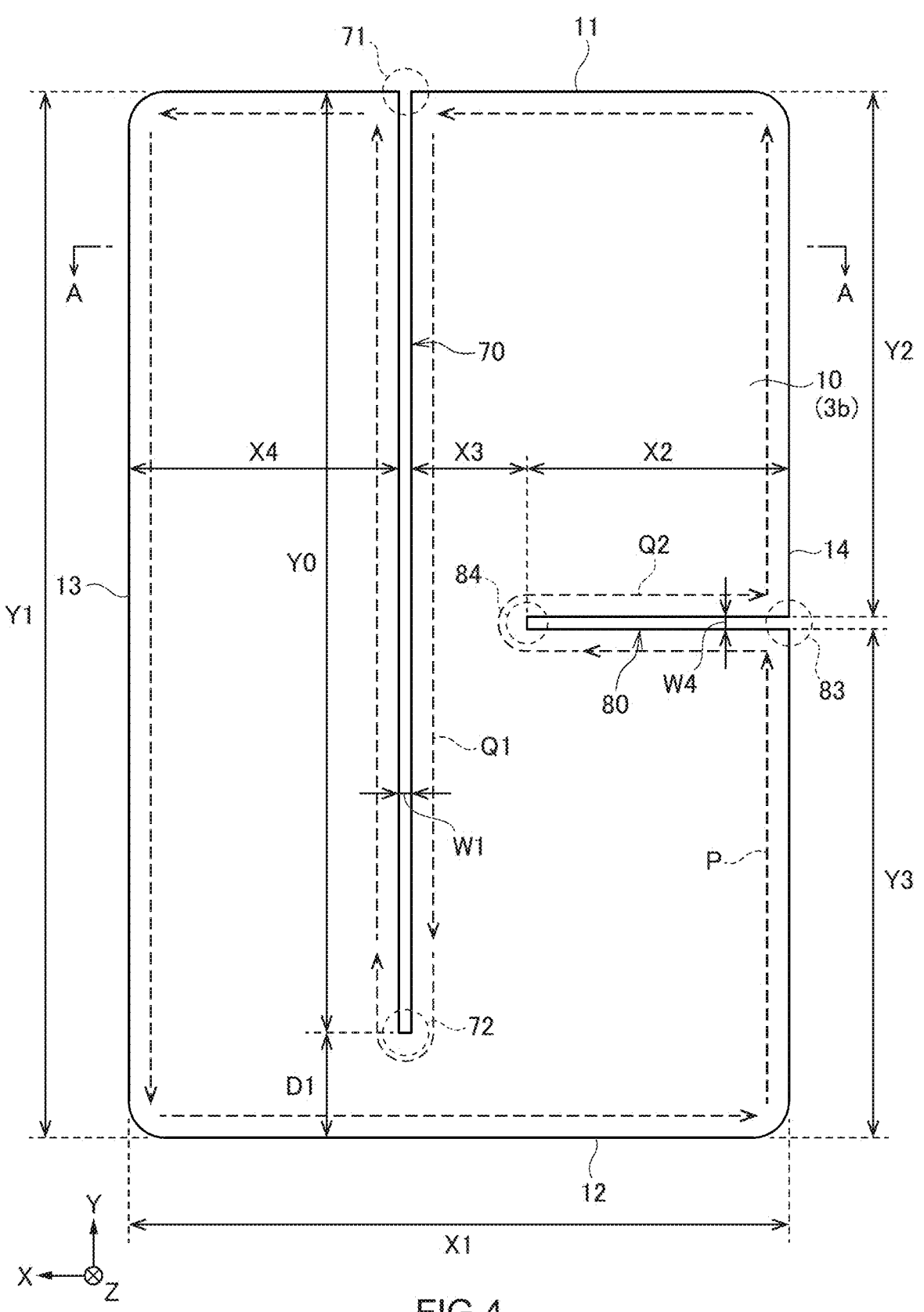
FIG. 4 is a schematic plan view of the bottom metal plate 10 constituting the antenna device 1.

FIG. 4 is a schematic plan view of the bottom metal plate 10 constituting the antenna device 1. The line A-A illustrated in FIG. 4 indicates the sectional position in FIG. 3. The same applies to FIGS. 5, 6, and 9.

As illustrated in FIG. 4, the bottom metal plate 10 has outer edges 11 and 12 extending in the X-direction (shorter length direction) and facing each other in the Y-direction (longer length direction) and outer edges 13 and 14 extending in the Y-direction (longer length direction) and facing each other in the X-direction (shorter length direction). The length of the bottom metal plate 10 in the X-direction is X1, and the length thereof in the Y-direction is Y1 (>X1). The bottom metal plate 10 further has a slit 70 extending in the Y-direction (longer length direction) and a slit 80 extending in the X-direction (shorter length direction). The length Y0 of the slit 70 in the Y direction is longer than the length X2 of the slit 80 in the X direction. The slit 70 has a constant width W1 in the X-direction. That is, the slit 70 does not have a widened part where the width in the X-direction locally increases. Similarly, the slit 80 has a constant width W4 in the Y-direction. That is, the slit 80 does not have a widened part where the width in the Y-direction locally increases. Further, the slit 70 is not positioned at the center in the X-direction but offset to the outer edge 13 side. In other words, the distance X4 between the slit 70 and the outer edge 13 in the X direction is shorter than the distance X2+X3 between the slit 70 and the outer edge 14 in the X-direction. It should be noted that the "constant" includes an error caused due to manufacturing variations.

The slit 70 has first and second ends 71 and 72 positioned at both ends in the Y-direction. The first end 71 is opened so as to divide the outer edge 11, while the second end 72 does not reach the outer edge 12 and is terminated at a position away from the outer edge 12 by a first distance D1. The first distance D1 is sufficiently smaller than the length Y1 of the bottom metal plate 10 in the Y-direction and is not more than half or less of the length Y1. That is, a length Y0 of the slit 70 in the Y-direction is sufficiently large and is not less than half or more of the length Y1 of the bottom metal plate 10 in the Y-direction. The length of the slit 70 in the Y-direction may be two-thirds or more, three-fourths or more, and four-fifths or more of the length Y1. In the example illustrated in FIG. 4, the length Y0 of the slit 70 in the Y-direction is about nine-tenths of the length Y1.

The slit 80 has third and fourth ends 83 and 84 positioned at both ends in the X-direction. The third end 83 is opened so as to divide the outer edge 14, while the fourth end 84 does not reach the outer edge 13 and is terminated at a position away from the outer edge 13 by a distance X3+X4. The slit 70 exists on the extension line of the slit 80. The length of the slit 80 in the X-direction is X2, and the distance in the X-direction between the fourth end 84 of the slit 80 and the slit 70 is X3. The length X2 may be longer than the distance X3. The distance Y2 in the Y-direction between the slit 80 and the outer edge 11 and the distance Y3 in the Y-direction between the slit 80 and the outer edge 12 may be the same as each other. In this way, the length X2 of the slit 80 in the X-direction can be sufficiently secured by offsetting the X-direction position of the slit 70 toward the outer edge 13 and disposing the slit 80 on the outer edge 14 side. In addition, since the distance X3 is also secured, the decrease in the mechanical strength of the bottom metal plate 10 due to the slits 70 and 80 is suppressed.

Figure 5:
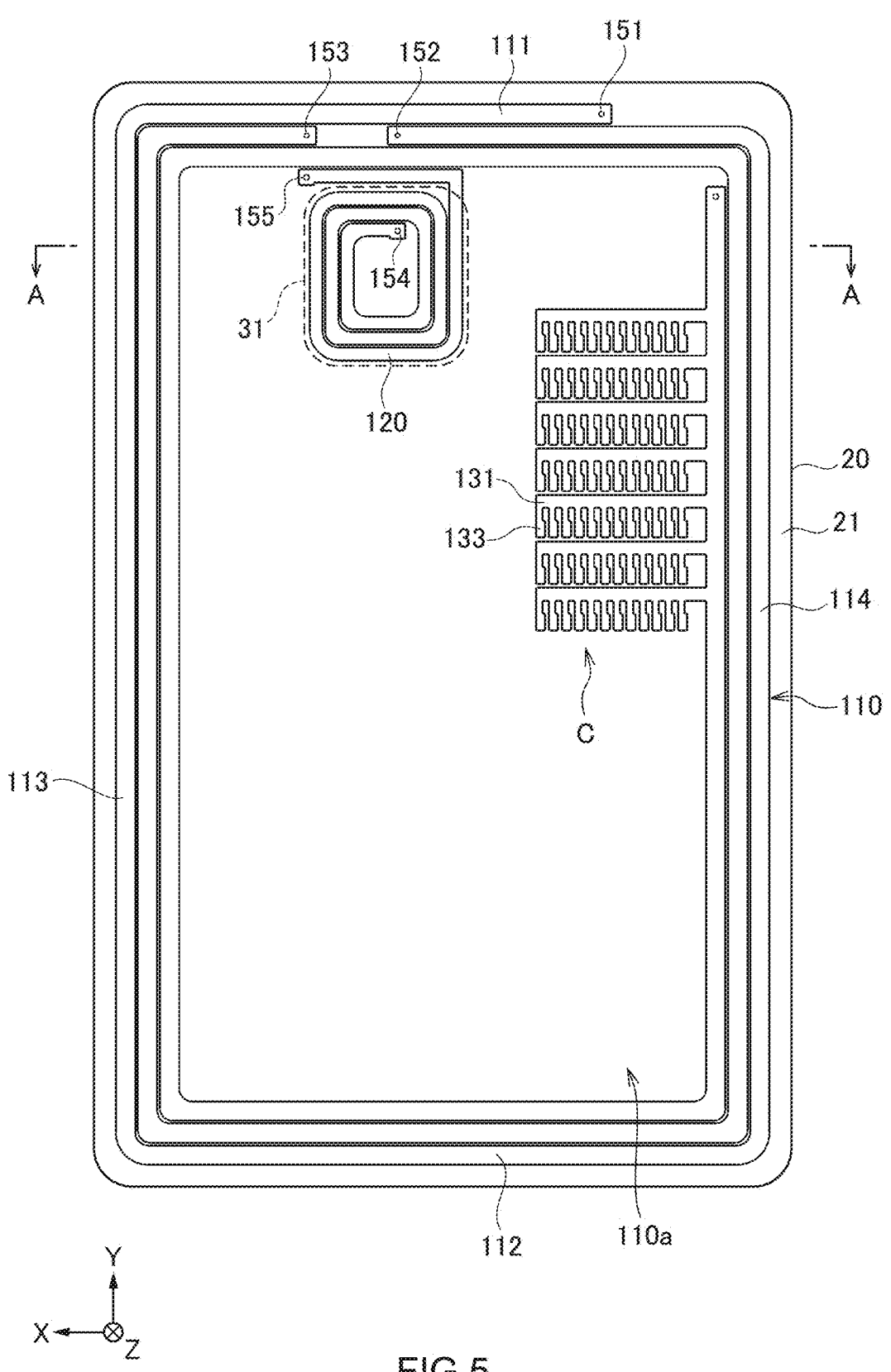
FIG. 5 is a schematic plan view of the conductor patterns formed on the first main surface 21 of the substrate 20 in the antenna device 1.

FIG. 5 is a schematic plan view of the conductor patterns formed on the first main surface 21 of the substrate 20.

As illustrated in FIG. 5, the first main surface 21 of the substrate 20 has thereon the first coil 110, second coil 120, and capacitor patterns 131 and 133. The first coil 110 is a pattern wound in about three turns along the outer edge of the substrate 20, and the second coil 120 and capacitor patterns 131 and 133 are disposed in an opening 110a surrounded by the first coil 110. The first coil 110 has sections 111 and 112 extending in the X-direction along the respective outer edges 11 and 12 of the bottom metal plate 10 and sections 113 and 114 extending in the Y-direction along the respective outer edges 13 and 14 of the bottom metal plate 10. The second coil 120 is disposed at a position overlapping the through hole 31 of the magnetic body 30. In the example illustrated in FIG. 5, the number of turns of the second coil 120 is also about three.

The capacitor pattern 131 is a pattern branched in the X-direction from the innermost turn of the first coil 110. In the example illustrated in FIG. 5, seven capacitor patterns 131 are branched from the innermost turn of the first coil 110; however, the number of the capacitor patterns 131 is not particularly limited. Further, a plurality of the capacitor patterns 133 are branched from one capacitor pattern 131. The capacitor patterns 133 all extend in the Y-direction. In the example illustrated in FIG. 5, twelve capacitor patterns 133 are branched from the capacitor pattern 131; however, the number of the capacitor patterns 133 is not particularly limited.

Figure 6:
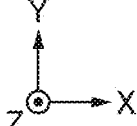
FIG. 6 is a schematic plan view of the conductor patterns formed on the second main surface 22 of the substrate 20 in the antenna device 1.

FIG. 6 is a schematic plan view of the conductor patterns formed on the second main surface 22 of the substrate 20.

As illustrated in FIG. 6, the second main surface 22 of the substrate 20 has thereon capacitor patterns 132, 134 and connection patterns 141, 142. The planar positions of the capacitor patterns 132 and 134 coincide with those of the capacitor patterns 131 and 133, respectively. That is, the capacitor patterns 131 and 132 are opposed to each other through the substrate 20, and the capacitor patterns 133 and 134 are opposed to each other through the substrate 20. Thus, the capacitor patterns 131, 133 provided on the first main surface 21 of the substrate 20, the capacitor patterns 132, 134 provided on the second main surface 22 of the substrate 20, and the substrate 20 positioned therebetween constitute a capacitor C. The capacitance of the capacitor C having such a pattern shape can be finely adjusted by removing some of the capacitor patterns 133 by trimming.

As illustrated in FIGS. 5 and 6, the outer peripheral end of the first coil 110 is connected to the capacitor patterns 132 and 134 through a via conductor 151 penetrating the substrate 20. Further, out of the turns of the first coil 110, the second turn counted from the outermost turn (second turn counted from the innermost turn) is partially discontinuous. One end and the other end of the discontinuous part are connected respectively to via conductors 152 and 153 penetrating the substrate 20. The via conductor 152 is connected to one end of the connection pattern 141, and the via conductor 153 is connected to one end of the connection pattern 142. The other ends of the connection patterns 141 and 142 are connected respectively to via conductors 154 and 155 penetrating the substrate 20. The via conductors 154 and 155 are connected respectively to the inner and outer peripheral ends of the second coil 120.

Figure 7:
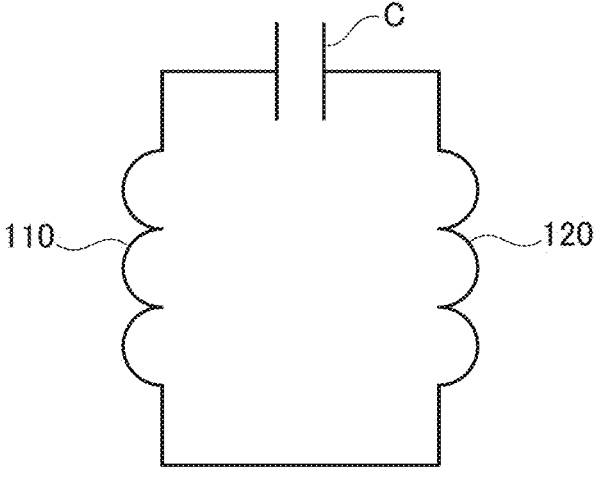
FIG. 7 is an equivalent circuit diagram of the antenna device 1.
Figure 8:
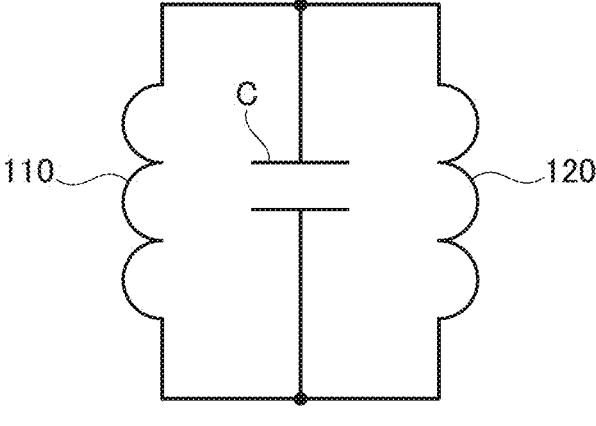
FIG. 8 is an equivalent circuit diagram of the antenna device according to a modification.

With the above configuration, the first coil 110 and second coil 120 are connected in series to each other and, as illustrated in FIG. 7, the capacitor C is connected in series to the first and second coils 110 and 120. A resonance circuit constituted by the first and second coils 110, 120 and capacitor C forms a closed circuit not connected to any external circuits. The capacitor C acts to enhance communication characteristics through adjustment of the resonance frequency. By setting the resonance frequency of the closed circuit to a frequency band around 13.56 MHz or 13.56 MHz, NFC (Near Field Communication) is enabled. Alternatively, as illustrated in FIG. 8, the capacitor C may be connected in parallel to the first and second coils 110 and 120. In this case, designing the line length of the first coil 110 smaller than the line length of the second coil 120 allows achievement of the same resonance characteristics as those obtained when the capacitor C is connected in series to the first and second coils 110 and 120.

Figure 9:
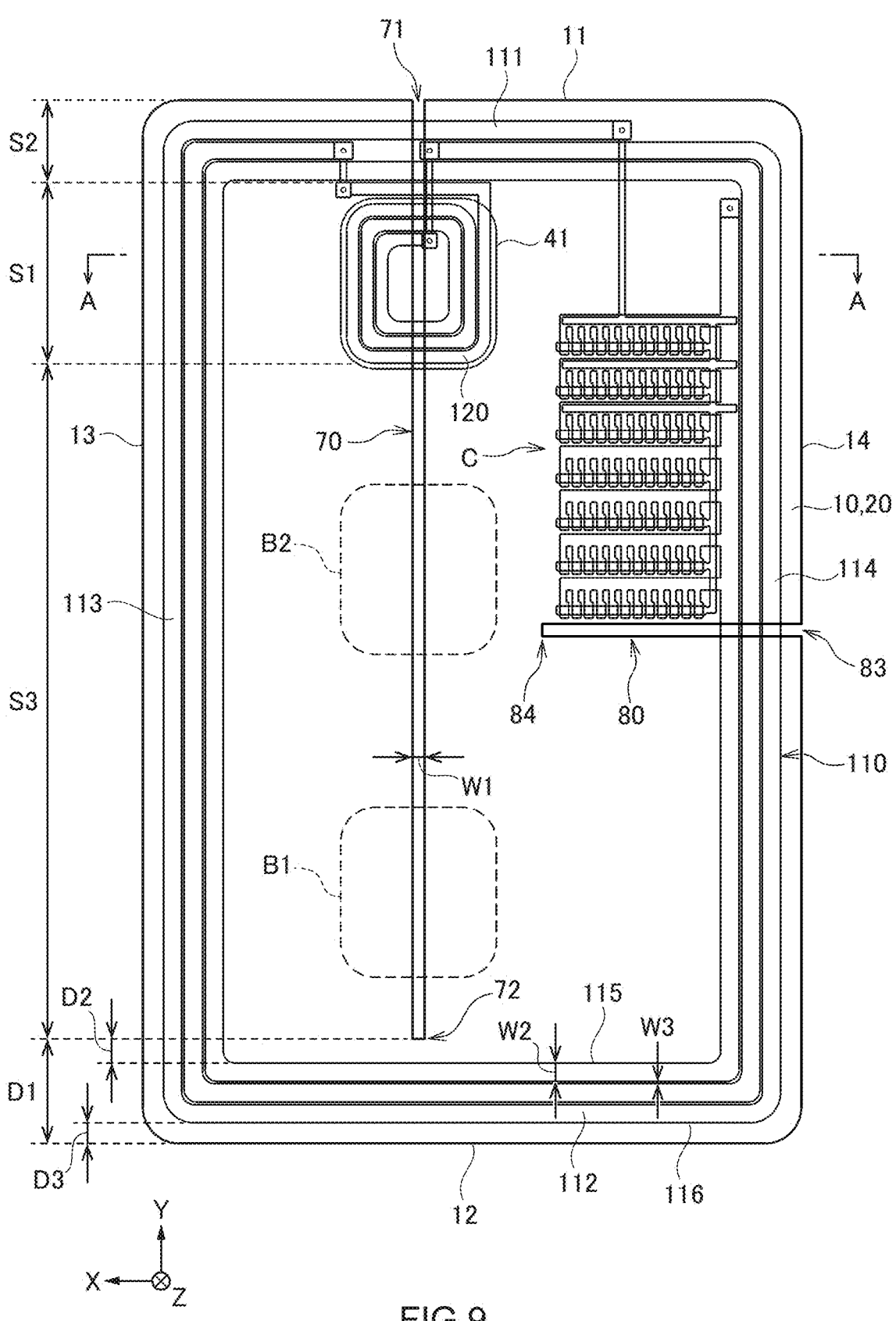
FIG. 9 is a schematic plan view illustrating a state where the bottom metal plate 10 and substrate 20 overlap each other in the antenna device 1.

FIG. 9 is a schematic plan view illustrating a state where the bottom metal plate 10 and substrate 20 overlap each other.

As illustrated in FIG. 9, the bottom metal plate 10 and substrate 20 are made to overlap each other such that the second coil 120 is disposed at an area surrounded by the through hole 41 in a plan view (as viewed in the Z-direction). In this state, the first coil 110 travels around along the outer edges 11 to 14 of the bottom metal plate 10 in an overlapping state with the bottom metal plate 10 in a plan view (as viewed in the Z-direction). The section 111 of the first coil 110 that extends in the X-direction along the outer edge 11 partially overlaps the slit 70. On the other hand, the section 112 of the first coil 110 that extends in the X-direction along the outer edge 12 does not overlap the slit 70. That is, the second end 72 of the slit 70 is positioned inside the innermost turn of the first coil 110.

The second end 72 of the slit 70 is away from an inner edge 115 of the innermost turn of the first coil 110 by a second distance D2. The second distance D2 may be larger than a pattern width W2 of the first coil 110. An outer edge 116 of the outermost turn of the first coil 110 is away from the outer edge 12 of the bottom metal plate 10 by a third distance D3. The second distance D2 may be larger than the third distance D3. This is because, since a magnetic flux density becomes maximum in the vicinity of the innermost turn of the first coil 110 in the opening 110a, ensuring the second distance D2 to a certain extent allows more magnetic flux to be applied to the bottom metal plate 10 functioning as an antenna.

As illustrated in FIG. 9, the second coil 120 is disposed at a position crossed by the slit 70. Thus, the slit 70 is sectioned into a first section S1 overlapping the second coil 120, a second section S2 positioned between the first section S1 and the first end 71, and a third section S3 positioned between the first section S1 and the second end 72. The first section S1 is a section between a part of the second coil 120 that overlaps the outer edge of the outermost turn on one side in the Y-direction and a part of the second coil 120 that overlaps the outer edge of the outermost turn on the other side in the Y-direction. In the present embodiment, the second coil 120 is disposed offset to the one side in the Y-direction, and thus the third section S3 is longer than the second section S2. The length of the third section S3 is sufficiently large and is larger than at least the first distance D1. As described above, the first distance D1 is the distance between the second end 72 of the slit 70 and the outer edge 12 of the bottom metal plate 10 in the Y-direction.

The second coil 120 may be disposed offset to the other side in the Y-direction. For example, the second coil 120 may be disposed at a position B1 illustrated in FIG. 9. In this case, the third section S3 is shorter than the second section S2. In such a case, the length of the second section S2 is made larger than the first distance D1. Alternatively, the second coil 120 may be disposed at the intermediate position of the slit 70 in the Y-direction. For example, the second coil 120 may be disposed at a position B2 illustrated in FIG. 9. In this case, the lengths of the second and third sections S2 and S3 are the same as each other. In such a case, the lengths of the second and third sections S2 and S3 are made larger than the first distance D1. That is, the first distance D1 may be designed smaller than the longer one of the second and third sections S2 and S3. However, making the third section S3 longer than the second section S2 can increase communication distance.

The width W1 of the slit 70 in the X-direction may be larger than a width W3 of a space between adjacent turns of the first coil 110. This can enhance the radiation characteristics of the bottom metal plate 10 while ensuring a sufficient area of the opening 110a of the first coil 110.

Furthermore, among the conductor pattern constituting the first coil 110, a part of section 114 extending in the Y-direction along outer edge 14 overlaps with slit 80. Slit 80 does not overlap with either second coil 120 or capacitor patterns 131 to 134. Capacitor patterns 131 to 134 do not overlap with slit 70 either.

Figure 10:
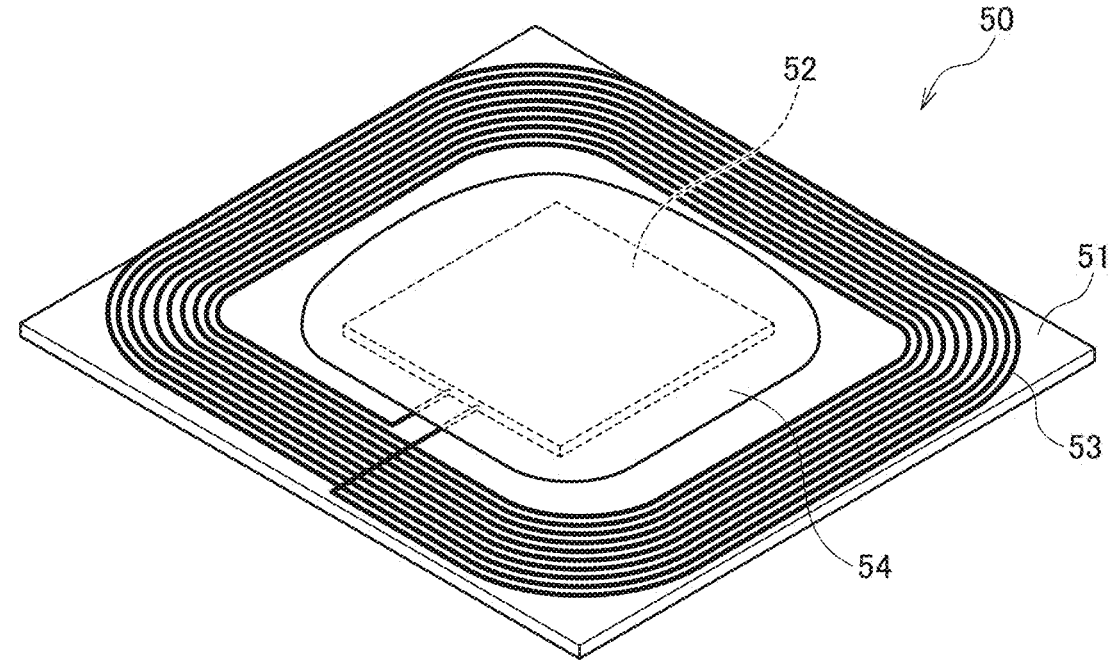
FIG. 10 is a schematic perspective view of the IC module 50 as viewed from the back surface side thereof.

FIG. 10 is a schematic perspective view of the IC module 50 as viewed from the back surface side thereof.

As illustrated in FIG. 10, the IC module 50 includes a module substrate 51, an IC chip 52 mounted on or incorporated in the module substrate 51, and a coupling coil 53. The IC chip 52 is protected by being covered with a dome-shaped protective resin 54. The protective resin 54 is made of an insulating member and may be partially disposed in the through hole 31, as illustrated in FIG. 3. The terminal electrode E illustrated in FIG. 1 is provided on the back surface side of the module substrate 51. The IC module 50 thus configured is accommodated in the through hole 41 formed in the top metal plate 40. In a state where the IC module 50 is accommodated in the through hole 41, the coupling coil 53 and second coil 120 provided on the substrate 20 are electromagnetically coupled to each other. The second coil 120 is connected in series to the first coil 110 as described above, so that when a current flows in the second coil 120, it also flows in the first coil 110 to generate a magnetic field from the first coil 110. The magnetic field generated from the first coil 110 causes an eddy current in the bottom metal plate 10. The eddy current generated in the bottom metal plate 10 includes, as illustrated in FIG. 4, a component P traveling around along the outer periphery of the bottom metal plate 10 and components Q1 and Q2 traveling around along the slits 70 and 80, respectively. The component P and the components Q1 and Q2 travel around in the opposite directions. The components Q1 and Q2 traveling around in the clockwise direction contributes to communication, and the component P traveling around in the counterclockwise direction cancels the magnetic flux of an antenna. The component Q1 traveling around along the slit 70 and component Q2 traveling around along the slit 80 are thus generated in the bottom metal plate 10, allowing the bottom metal plate 10 itself to function as an antenna. Furthermore, since the two slits 70 and 80 generate two components Q1 and Q2 that contribute to communication, the communication distance can be increased compared to the case where there is one slit.

Figure 11:
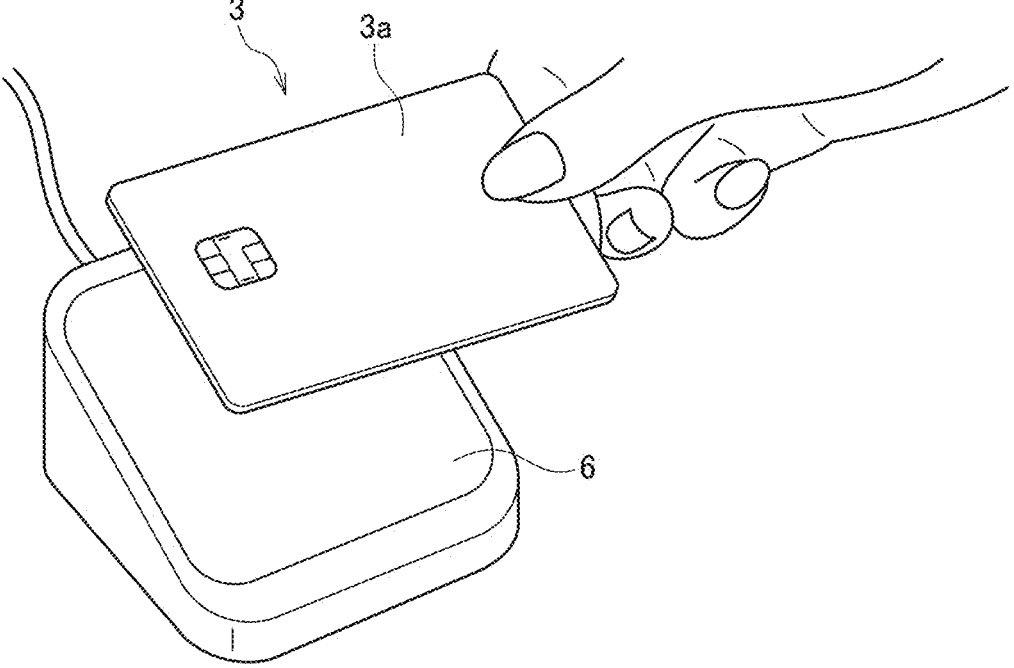
FIG. 11 is a schematic diagram showing a state in which the IC card 3 and the card reader 6 communicate.

Thus, as illustrated in FIG. 11, when the back surface 3b of the IC card 3 is made to face a card reader 6, communication can be performed between the card reader 6 and the IC chip 52. That is, the card reader 6 is coupled to the coupling coil 53 of the IC module 50 through the antenna device 1 constituted by the bottom metal plate 10 and first and second coils 110 and 120 and can thereby communicate with the IC chip 52.

As described above, the IC card 3 according to the present embodiment includes the antenna device 1 constituted by the first and second coils 110 and 120 and the bottom metal plate 10 having the slits 70 and 80, so that, despite the fact that both the upper and back surfaces 3a and 3b are made of a metal material, communication can be achieved by making the back surface 3b of the IC card 3 face the card reader 6. In addition, the slit 70 has a sufficient length, thus allowing an eddy current to largely travel around along the outer edges 11 to 14 of the bottom metal plate 10, which can increase communication distance. Further, since the second slit 80 extends in a direction perpendicular to the extending direction of the slit 70, it is possible to increase the communication distance. Moreover, since the first coil 110 is wound along the outer edges 11 to 14, communication distance can be further increased.

Figure 12:
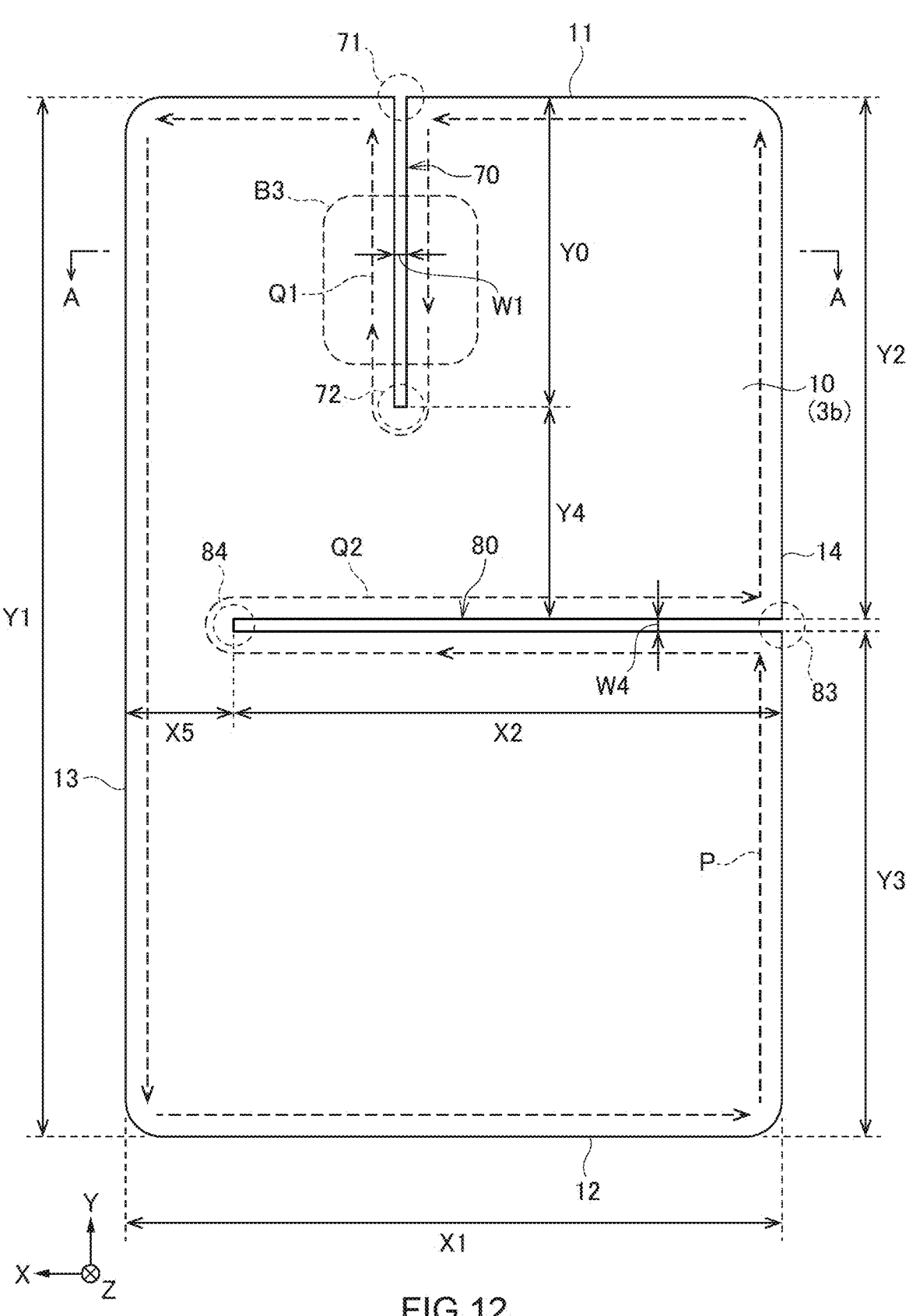
FIG. 12 is a schematic plan view of the bottom metal plate 10 according to a modification.

FIG. 12 is a schematic plan view of the bottom metal plate 10 according to a modification.

The bottom metal plate 10 illustrated in FIG. 12 differs from the bottom metal plate 10 illustrated in FIG. 4 in that the length X2 of the slit 80 in the X-direction is longer than the length Y0 of the slit 70 in the Y-direction. Other basic configurations are the same as those of the bottom metal plate 10 illustrated in FIG. 4, so the same reference numerals are given to the same elements, and overlapping description will be omitted. The second coil 120 is disposed at a position B3 illustrated in FIG. 12.

A distance X5 in the X-direction between the fourth end 84 of the slit 80 and the outer edge 13 is shorter than a length X2 of the slit 80 in the X-direction. The slit 80 exists on an extension line of the slit 70. A distance Y4 in the Y-direction between the second end 72 of the slit 70 and the slit 80. A length Y0 of the slit 70 in the Y-direction may be longer than the distance Y4. The distance Y4 may be longer than the distance X5. This ensures the mechanical strength of the bottom metal plate 10.

Figure 13:
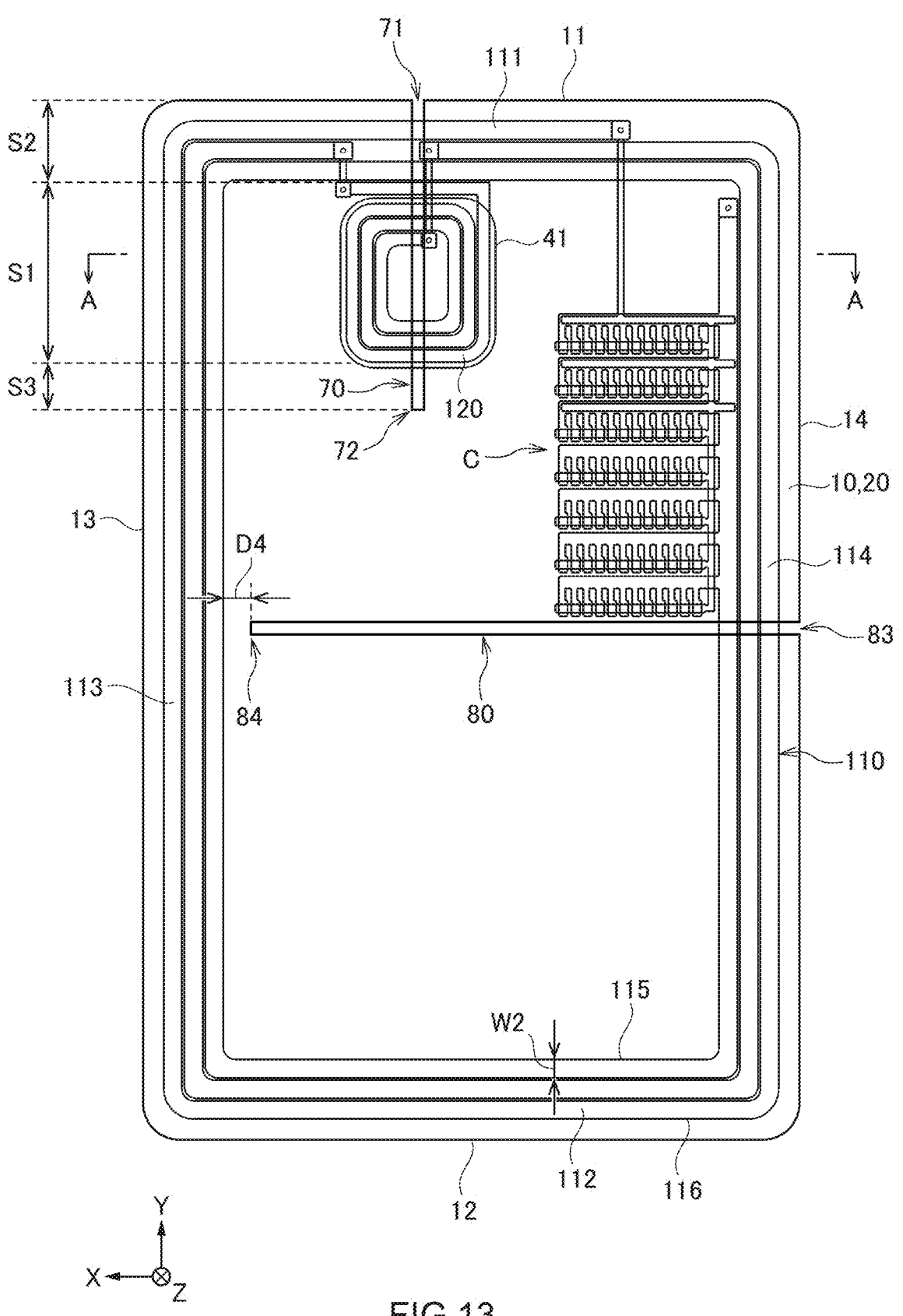
FIG. 13 is a schematic plan view illustrating a state where the bottom metal plate 10 and substrate 20 overlap each other in a modification.

FIG. 13 is a schematic plan view illustrating a state where the bottom metal plate 10 and substrate 20 overlap each other in a modification.

As shown in FIG. 13, when the bottom metal plate 10 according to the modification and the substrate 20 are overlapped, the slit 70 and the second coil 120 overlap with each other. In this example, the length Y0 of the slit 70 in the Y-direction is shortened, so that the third section S3 is shorter than the second section S2. In addition, in this example, although the length X2 of the slit 80 in the X-direction is expanded, the section 113 of the first coil 110 extending in the X-direction along the outer edge 13 does not overlap with the slit 80. In other words, the fourth end 84 of the slit 80 is located inside the innermost turn of the first coil 110. The fourth end 84 of the slit 80 is separated from the inner edge 115 of the innermost turn of the first coil 110 by a fourth distance D4. The fourth distance D4 may be larger than the pattern width W2 of the first coil 110. In this way, more magnetic flux can be applied to the bottom metal plate 10 functioning as an antenna by ensuring a certain degree of the fourth distance D4.

While some embodiment of the present disclosure has been described, the present disclosure is not limited to the above embodiment, and various modifications may be made within the scope of the present disclosure, and all such modifications are included in the present disclosure.

For example, the conductor patterns provided on the first and second main surfaces 21 and 22 of the substrate 20 may be provided thereon through another material layer such as a conductive resin layer.

The technology according to the present disclosure includes the following configuration examples but not limited thereto.

An antenna device according to one embodiment of the present disclosure includes: a metal plate having a first slit extending in a long side direction thereof and a second slit extending in a short side direction thereof; a first coil disposed so as to overlap with the metal plate in a plan view and circling along an outer edge of the metal plate; and a second coil electrically connected to the first coil, disposed so as to be surrounded by the first coil, and disposed so as to overlap with the first slit. The first slit has a first end that is open to divide the outer edge of the metal plate and a second end terminating without reaching the outer edge of the metal plate. The second slit has a third end that is open to divide the outer edge of the metal plate and a fourth end terminating without reaching the outer edge of the metal plate. With the above configuration, communication distance can be increased.

In the above antenna device, the first slit may include a first section overlapping with the second coil, a second section located between the first section and the first end, and a third section located between the first section and the second end. This can further increase communication distance.

In the above antenna device, the second slit may be longer than the first slit. This ensures the mechanical strength of the metal plate.

In the above antenna device, the fourth end of the second slit may be positioned inside an innermost turn of the first coil. In this case, more magnetic flux can be applied to the metal plate functioning as an antenna.

In the above antenna device, a first distance between the fourth end of the second slit and the outer edge of the metal plate in the short side direction may be smaller than a second distance between the second end of the first slit and the second slit in the long side direction. This ensures the mechanical strength of the metal plate.

In the above antenna device, the first slit may be longer than the second slit. This can further increase communication distance.

In the above antenna device, the second end of the first slit may be positioned inside an innermost turn of the first coil. In this case, more magnetic flux can be applied to the metal plate functioning as an antenna.

In the above antenna device, the outer edge of the metal plate may include first and second outer edge extending in the long side direction, the first slit may be located closer to the first outer edge than the second outer edge, and the third end of the second slit may divide the second outer edge. In this case, the length of the second slit in the short side direction can be sufficiently secured.

Any of the above antenna devices may further include a capacitor electrically connected to the first and second coil, and the capacitor may overlap with the metal plate in a plan view so as not to overlap with the first and second slits. In this case, sufficient capacitance can be obtained.

In the above antenna device, the capacitor may be electrically connected in serial to the first and second coils. In this case, the capacitor acts to enhance communication characteristics through adjustment of the resonance frequency.

In the above antenna device, the capacitor may be electrically connected in parallel with the first and second coils, and the first coil may be shorter in line length than the second coil. In this case, the same resonance characteristics can be obtained as those obtained when the capacitor is connected in series to the first and second coils.

An IC card according to one embodiment of the present disclosure includes an antenna device, a second metal plate having an opening, and an IC module disposed in the opening of the second metal plate. The antenna device includes: a first metal plate having a first slit extending in a long side direction thereof and a second slit extending in a short side direction thereof; a first coil disposed so as to overlap with the first metal plate in a plan view and circling along an outer edge of the first metal plate; and a second coil electrically connected to the first coil, disposed so as to be surrounded by the first coil, and disposed so as to overlap with the first slit. The first slit has a first end that is open to divide the outer edge of the first metal plate and a second end terminating without reaching the outer edge of the first metal plate. The second slit has a third end that is open to divide the outer edge of the first metal plate and a fourth end terminating without reaching the outer edge of the first metal plate. The first and second coils are sandwiched between first and second metal plates such that the IC module overlaps with the second coil. With the above configuration, despite the fact that both the upper and back surfaces are made of a metal material, communication can be achieved by making the back surface of the IC card face a card reader.

What is claimed is:

1. An antenna device comprising:
a metal plate having a first slit extending in a long side direction thereof and a second slit extending in a short side direction thereof;
a first coil disposed so as to overlap with the metal plate in a plan view and circling along an outer edge of the metal plate; and
a second coil electrically connected to the first coil, disposed so as to be surrounded by the first coil, and disposed so as to overlap with the first slit,
wherein the first slit has a first end that is open to divide the outer edge of the metal plate and a second end terminating without reaching the outer edge of the metal plate,
wherein the second slit has a third end that is open to divide the outer edge of the metal plate and a fourth end terminating without reaching the outer edge of the metal plate, and
wherein a length of the first slit in the long side direction is equal to or longer than half a length of the metal plate in the long side direction, or a length of the second slit in the short side direction is equal to or longer than half a length of the metal plate in the short side direction.

2. The antenna device as claimed in claim 1, wherein the first slit includes a first section overlapping with the second coil, a second section located between the first section and the first end, and a third section located between the first section and the second end.

3. The antenna device as claimed in claim 1, wherein the second slit is longer than the first slit.

4. The antenna device as claimed in claim 3, wherein the fourth end of the second slit is positioned inside an innermost turn of the first coil.

5. The antenna device as claimed in claim 3, wherein a first distance between the fourth end of the second slit and the outer edge of the metal plate in the short side direction is smaller than a second distance between the second end of the first slit and the second slit in the long side direction.

6. The antenna device as claimed in claim 3, wherein a virtual line on the metal plate extending in the long side direction from the second end of the first slit to the outer edge of the metal plate intersects with the second slit.

7. The antenna device as claimed in claim 6, wherein a third distance between the second end of the first slit and the second slit along the virtual line is smaller than a length of the first slit in the long side direction.

8. The antenna device as claimed in claim 1, wherein the first slit is longer than the second slit.

9. The antenna device as claimed in claim 8, wherein the second end of the first slit is positioned inside an innermost turn of the first coil.

10. The antenna device as claimed in claim 8,
wherein the outer edge of the metal plate includes first and second outer edge extending in the long side direction,
wherein the first slit is located closer to the first outer edge than the second outer edge, and
wherein the third end of the second slit divides the second outer edge.

11. The antenna device as claimed in claim 8, wherein a virtual line on the metal plate extending in the short side direction from the fourth end of the second slit to the outer edge of the metal plate intersects with the first slit.

12. The antenna device as claimed in claim 11, wherein a distance between the fourth end of the second slit and the first slit along the virtual line is smaller than a length of the second slit in the short side direction.

13. The antenna device as claimed in claim 1, further comprising a capacitor electrically connected to the first and second coils, wherein the capacitor overlaps with the metal plate in a plan view so as not to overlap with the first and second slits.

14. The antenna device as claimed in claim 13, wherein the capacitor is electrically connected in series to the first and second coils.

15. The antenna device as claimed in claim 13, wherein the capacitor is electrically connected in parallel with the first and second coils, and wherein the first coil is shorter in line length than the second coil.

16. An IC card comprising:

an antenna device comprising:

a first metal plate having a first slit extending in a long side direction thereof and a second slit extending in a short side direction thereof;

a first coil disposed so as to overlap with the first metal plate in a plan view and circling along an outer edge of the first metal plate; and a second coil electrically connected to the first coil, disposed so as to be surrounded by the first coil, and disposed so as to overlap with the first slit;

a second metal plate having an opening; and an IC module disposed in the opening of the second metal plate, wherein the first slit has a first end that is open to divide the outer edge of the first metal plate and a second end terminating without reaching the outer edge of the first metal plate, wherein the second slit has a third end that is open to divide the outer edge of the first metal plate and a fourth end terminating without reaching the outer edge of the first metal plate, wherein a length of the first slit in the long side direction is longer than half a length of the metal plate in the long side direction, or a length of the second slit in the short side direction is longer than half a length of the metal plate in the short side direction, and wherein the first and second coils are sandwiched between the first and second metal plates such that the IC module overlaps with the second coil.

17. An antenna device comprising:

a metal plate having first and second outer edges extending in a first direction, third and fourth outer edges extending in a second direction perpendicular to the first direction, a first slit extending in the second direction, and a second slit extending in the first direction;

a first coil disposed so as to overlap with the metal plate in a third direction perpendicular to the first and second directions and circling along the first, third, second, and fourth outer edges of the metal plate; and a second coil electrically connected to the first coil, disposed so as to be surrounded by the first coil, and disposed so as to overlap with the first slit in the third direction, wherein the first slit has a first end in the second direction that is open to divide the first outer edge of the metal plate and a second end in the second direction terminating without reaching the second outer edge of the metal plate, wherein the second slit has a third end in the first direction that is open to divide the third outer edge of the metal plate and a fourth end in the first direction terminating without reaching the fourth outer edge of the metal plate, and wherein a virtual line on the metal plate extending in the second direction from the second end of the first slit to the second outer edge of the metal plate intersects with the second slit.

18. The antenna device as claimed in claim 17, wherein a distance between the second end of the first slit and the second slit along the virtual line is smaller than a length of the first slit in the second direction.

19. The antenna device as claimed in claim 17, wherein a length of the second slit in the first direction is longer than half a length of the first outer edge of the metal plate.

20. The antenna device as claimed in claim 17, wherein a length of each of the first and second outer edges of the metal plate in the first direction is shorter than a length of each of the third and fourth outer edges of the metal plate in the second direction.

* * * * *